United States Patent [19]
Hoshino et al.

[11] Patent Number: 5,241,821
[45] Date of Patent: Sep. 7, 1993

[54] HYDRAULIC SYSTEM FOR A VEHICLE

[75] Inventors: Tatsuyuki Hoshino; Kunifumi Goto, both of Kariya, Japan

[73] Assignee: Kabushiki Kaisha Toyoda Jidoshokki Seisakusho, Kariya, Japan

[21] Appl. No.: 864,626

[22] Filed: Apr. 7, 1992

[30] Foreign Application Priority Data

Apr. 8, 1991 [JP] Japan .................................. 3-75365

[51] Int. Cl.$^5$ ............................................. F16D 31/02
[52] U.S. Cl. ........................................ 60/426; 60/420; 60/452; 91/518
[58] Field of Search ................. 60/420, 422, 426, 433, 60/434, 445, 450, 452; 91/511, 514, 518, 532

[56] References Cited

U.S. PATENT DOCUMENTS

| | | | |
|---|---|---|---|
| 3,579,987 | 5/1971 | Busse | 60/422 X |
| 4,420,935 | 12/1983 | Kobald | 60/452 X |
| 4,479,349 | 10/1984 | Westveer | 60/445 X |
| 4,553,389 | 11/1985 | Tischer et al. | 91/532 X |
| 4,559,778 | 12/1985 | Krusche | 60/452 X |
| 4,635,440 | 1/1987 | Kropp | 60/422 |
| 4,938,023 | 7/1990 | Yoshino | 60/420 X |
| 4,966,066 | 10/1990 | Kauss et al. | 91/532 X |

FOREIGN PATENT DOCUMENTS

62-12427 1/1987 Japan .

*Primary Examiner*—Edward K. Look
*Assistant Examiner*—Hoang Nguyen
*Attorney, Agent, or Firm*—Brooks Haidt Haffner & Delahunty

[57] ABSTRACT

An improved hydraulic system for a vehicle includes a swash plate type variable capacity hydraulic pump that is operably coupled to an engine. A hydraulic motor for driving an air conditioning compressor and a power steering hydraulic mechanism having less fluid demand than that of the hydraulic motor are disposed in a first and a second fluid lines respectively. First, second and third nozzles are disposed within the fluid lines. The volume of fluid controlled by the first nozzle is larger than that of the second nozzle, which is larger than that of the third nozzle. The first fluid line is depressurized by the first nozzle when the hydraulic motor is used, while the second fluid line is depressurized by the second nozzle when the power steering mechanism is used. When neither the hydraulic motor nor the power steering mechanism is used, the pressure in the fluid line on the circulation side is reduced to nearly zero by the third nozzle. The hydraulic cylinder is coupled to a swash plate, and a tracer valve adjusts the quantity of fluid in a hydraulic cylinder to control the inclination angle of the swash plate, as a function of the pressure in the fluid on the hydraulic pump side and the pressure in the depressurized fluid line on the power steering mechanism side.

18 Claims, 9 Drawing Sheets

HYDRAULIC SYSTEM FOR A VEHICLE

BACKGROUND OF THE INVENTION

1. Field of the Invention

The present invention relates to a hydraulic system for a vehicle, and more particularly, to a hydraulic system for simultaneously driving an air conditioning compressor and a power steering mechanism.

2. Description of the Related Art

Hydraulic systems used in certain vehicles are designed to simultaneously drive the power steering mechanism and the air conditioning compressor. This arrangement simplifies the design of the vehicle hydraulic system and requires less energy to operate.

A hydraulic system of this type is disclosed in the Japanese Unexamined Patent Publication No. 62-12427. FIG. 8 of this publication shows a hydraulic motor 101 which drives an air conditioning compressor 100, and which is connected to a hydraulic pump 103. A power steering mechanism 102 is also connected to the hydraulic pump 103, in series with the hydraulic motor 101.

The hydraulic pump 103 is driven by an engine and is connected to a first and second fluid bypass conduits or paths 104 and 105. A variable flow rate control valve 106 and a relief valve 107 are disposed in the fluid conduits 104 and 105 respectively. A controller 108 controls the actuation of the flow rate control valve 106 as a function of the driving loads of the air conditioning system.

When the power steering mechanism 102 is not activated, the low fluid pressure in the relief valve 107 causes the valve to block the second fluid conduit 105, and the pressurized fluid to flow through the first fluid conduit 104. When the power steering mechanism 102 is activated and the internal fluid pressure in the relief valve 107 rises, the valve opens, and the pressurized fluid from the hydraulic pump 103 flows directly to the power steering mechanism 102.

The design of the disclosed hydraulic system seems to ignore the significant effect of the normal operation of the steering mechanism. The hydraulic system appears to operate satisfactorily when the steering wheel mechanism 102 is activated while the vehicle is parked or is moving at a low speed, thus allowing the air conditioning system to function within its normal range of operation.

However, when the power steering mechanism 102 and the compressor 100 are operated simultaneously under normal driving conditions, the hydraulic system does not function in a completely satisfactory manner. In fact, the power steering mechanism 102 requires a significantly smaller volume of pressurized fluid as compared to the hydraulic pump 103. If the volume of pressurized fluid which is discharged from the hydraulic pump 103 is adjusted to conform to the normal specifications of the power steering mechanism 102, an insufficient volume of pressurized fluid will be made available to the hydraulic motor 101. To overcome this problem, the capacity of the hydraulic motor could be decreased, in order to raise the rotational velocity of the compressor 100. This design, however, presents another concern, namely reduced power to the compressor 100.

On the other hand, if the volume of fluid from the hydraulic pump 103 were adjusted to conform to the normal specifications of the hydraulic motor 101, an excessive volume of fluid would be discharged to the power steering mechanism 102 when the compressor 100 is not functional, thereby causing a significant loss of energy.

SUMMARY OF THE INVENTION

It is therefore an object of the present invention to provide a hydraulic system for a vehicle, which can adjust the amount of pressurized fluid that is supplied at any given time in accordance with the loads on an air conditioning system and a power steering system.

It is another object of the present invention to provide a hydraulic system for a vehicle, which supplies power enough to drive an air conditioning system, and prevents occurrence of the energy loss when a power steering mechanism is activated.

To achieve the foregoing and other objects and in accordance with the purpose of the present invention, an improved hydraulic system for vehicle is provided. The hydraulic system operably coupled to an engine, for driving a first and a second hydraulic mechanism disposed within a first and a second fluid lines of a hydraulic pump respectively, said first and second lines being connected to a hydraulic tank by way of a circulation fluid line, the discharge capacity of the hydraulic pump changing as a function of an inclination angle of a swash plate, and the first and second hydraulic mechanisms having different fluid pressure demand characteristics, the hydraulic system comprising first means for depressurizing the first fluid line when the first hydraulic mechanism is used, second means for depressurizing the second fluid line when the second hydraulic mechanism is used, third means for depressurizing the circulation fluid line when neither the first hydraulic mechanism nor the second hydraulic mechanism is used and swash plate control means for controlling the inclination angle of the swash plate as a function of the output pressures of said first, second and third depressurizing means.

DETAILED DESCRIPTION OF THE PREFERRED EMBODIMENTS

Figure 1A:
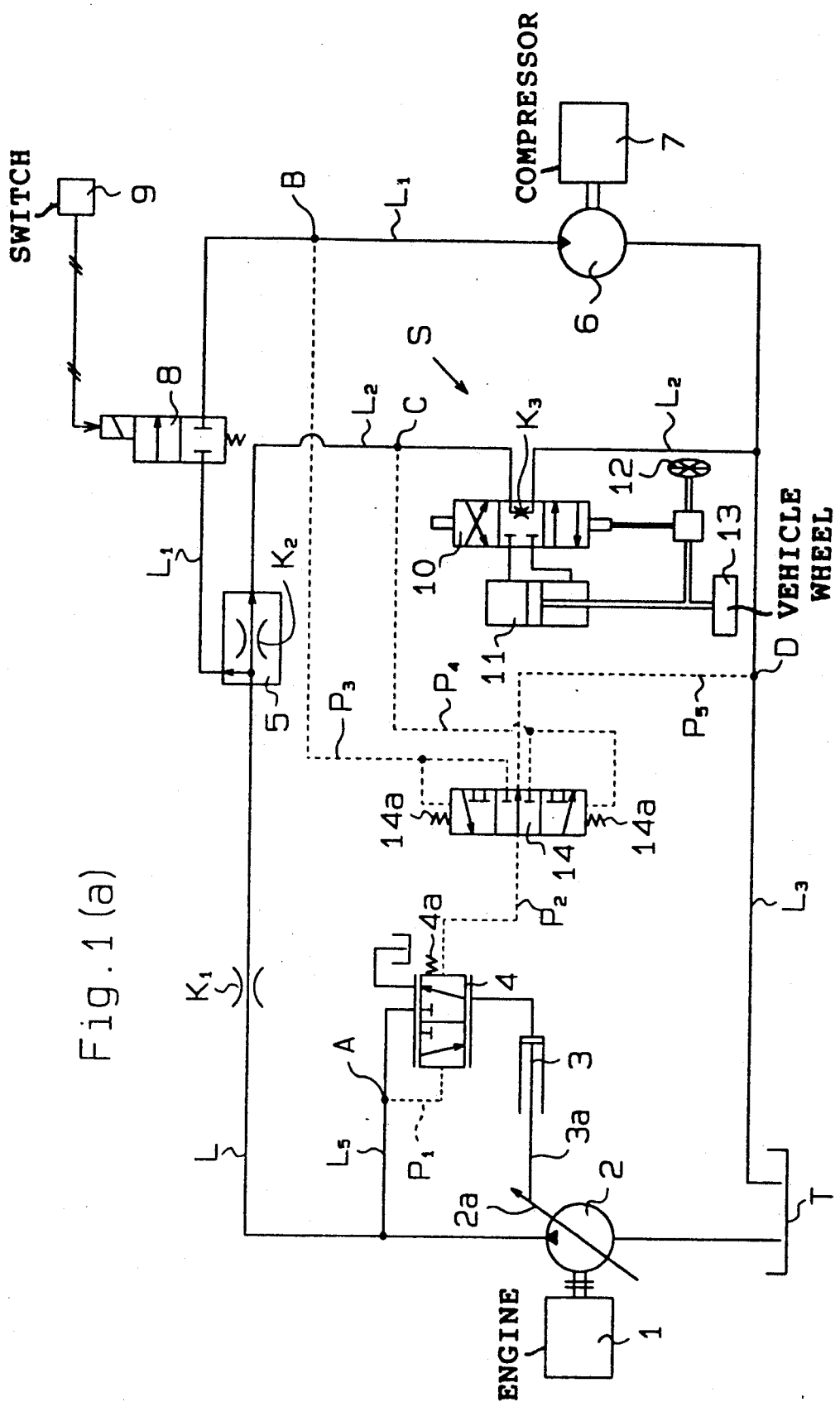
FIGS. 1(a) and 1(b) are hydraulic circuit diagrams both illustrating a hydraulic system according to the present invention when neither a power steering mechanism nor an air conditioning system is activated.

A preferred embodiment of the present invention will now be described in relation to FIGS. 1 to 5. FIG. 1 illustrates an engine 1 for use in a vehicle. The engine 1 is coupled to a variable capacity swash-plate type hydraulic pump 2. The pump 2 rotates with the engine 1, and draws pressurized fluid, such as oil, from an oil tank T. The volume of fluid which is discharged from the pump 2 corresponds to the inclination angle of a swash plate 2a. The pump 2 includes a cylinder 3 which, in turn, comprises a cylinder rod 3a that is coupled to the swash plate 2a, for adjusting the pump capacity.

A fluid line L5 branches from a main fluid line L. A swash plate adjusting valve 4 with two chambers and three ports is disposed along the fluid line L5. The adjusting valve 4 is used as a tracer valve which adjusts the opening of the pressure-fluid supply/discharge ports in order to control the volume of the fluid flowing through the line L5. The adjusting valve 4 controls the volume of fluid to be supplied to, and discharged from the cylinder 3, as a function of the pressure, in a first pilot fluid path P1, and the pressure in a second pilot fluid path P2. The path P1 branches from the line L5 at a point A, and the path P2 extends from a pressure sensing valve 14 to be described later.

Figure 1B:
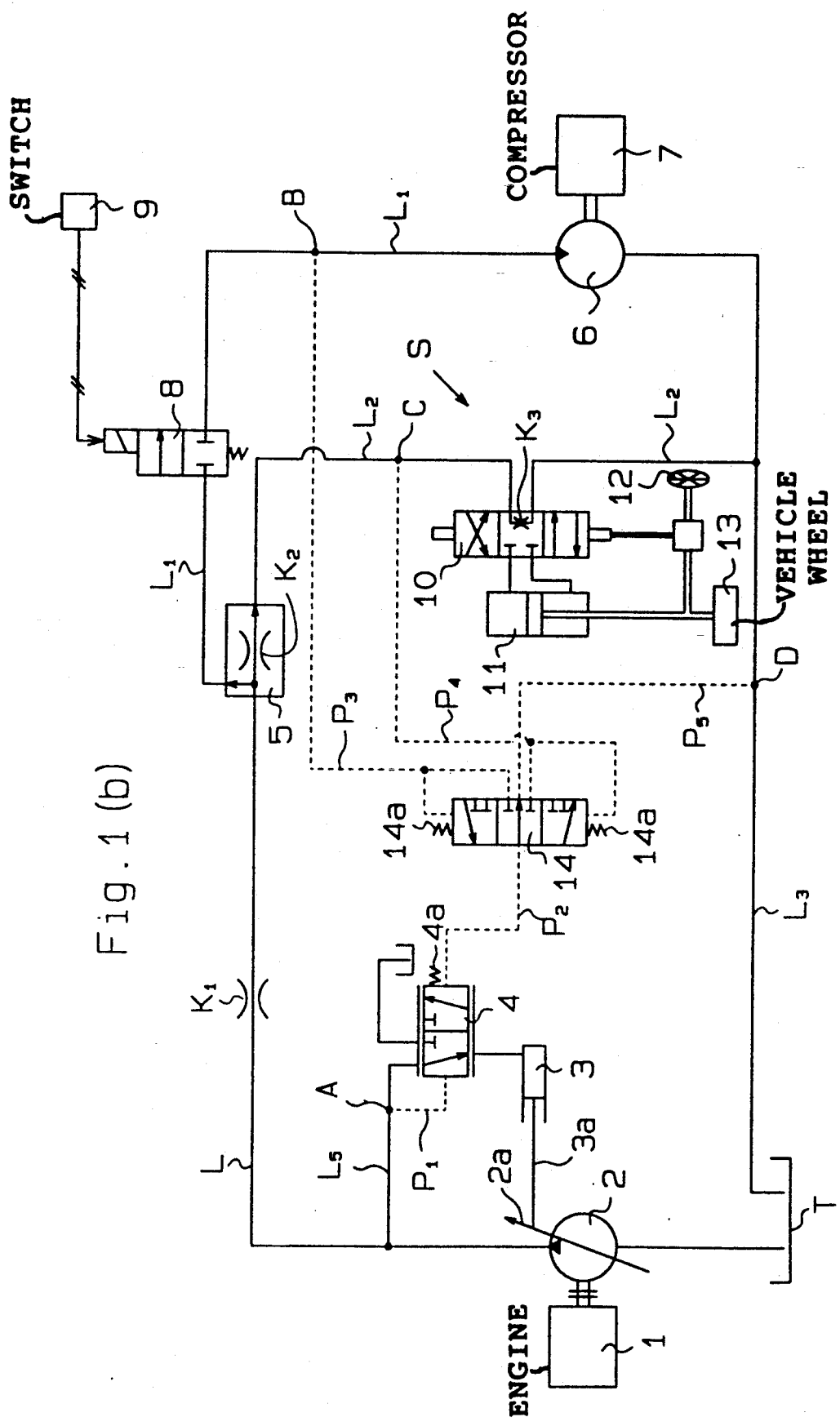
Figure 2:
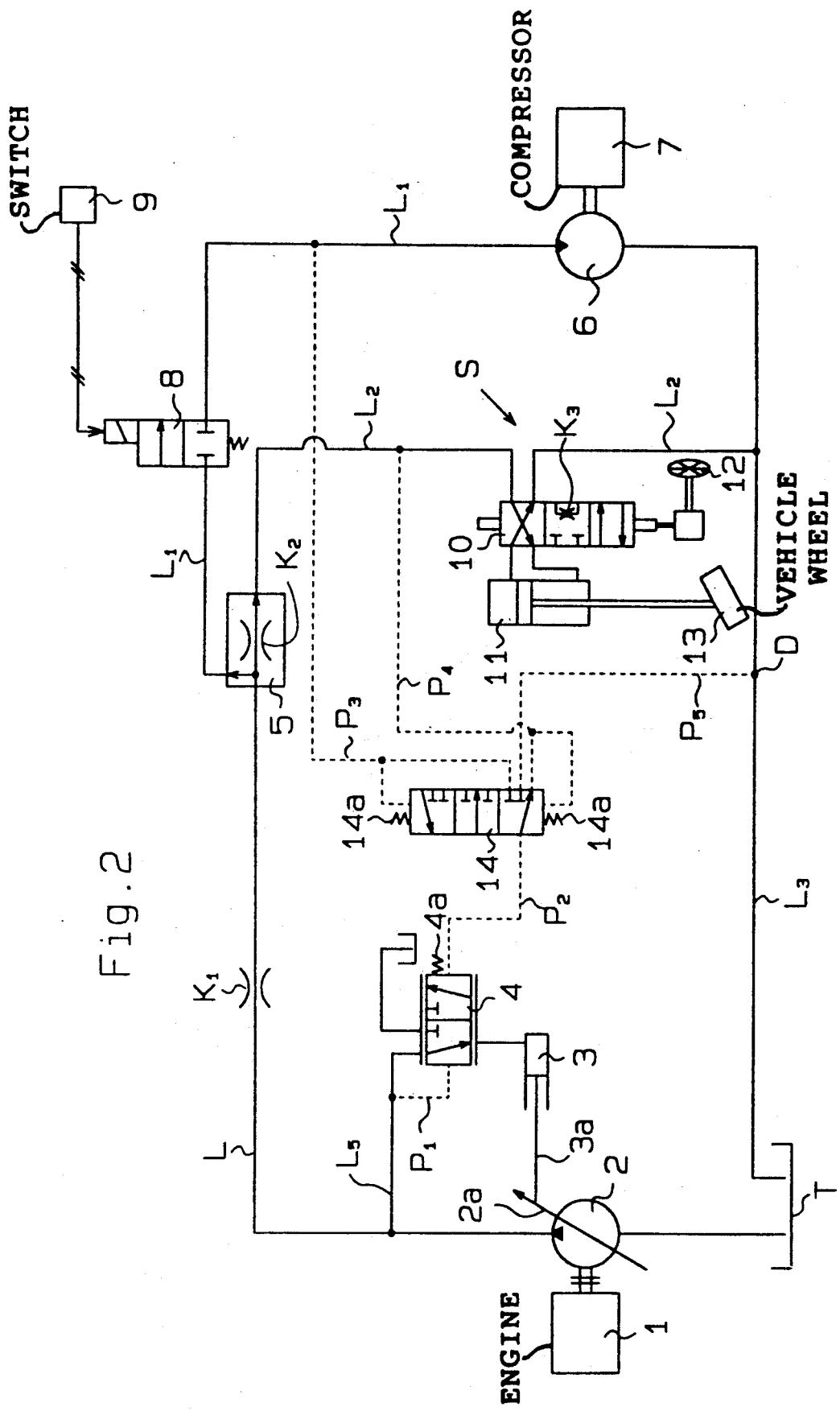
FIG. 2 is a circuit diagram illustrating the condition that occurs when a power steering mechanism in action.

When the fluid in both paths P1 and P2 is not pressurized, the adjusting valve 4 is held by the pressing force of a spring 4a, and is caused to discharge fluid from the cylinder 3, as shown in FIG. 1(a). On the other hand, when pressure is generated in both paths P1 and P2, and the pressure in path P1 is greater than the sum of the pressure in path P2 and the pressure generated by the spring 4a, the adjusting valve 4 causes the pressurized fluid to be supplied to the cylinder 3. The fluid is supplied at a pressure which corresponds to the difference between the pressures in the fluid paths P1 and P2, as shown in FIGS. 1(b) and 2. The supplied fluid thrusts the cylinder 3 forward and reduces the inclination angle of the swash plate 2a.

Figure 3:
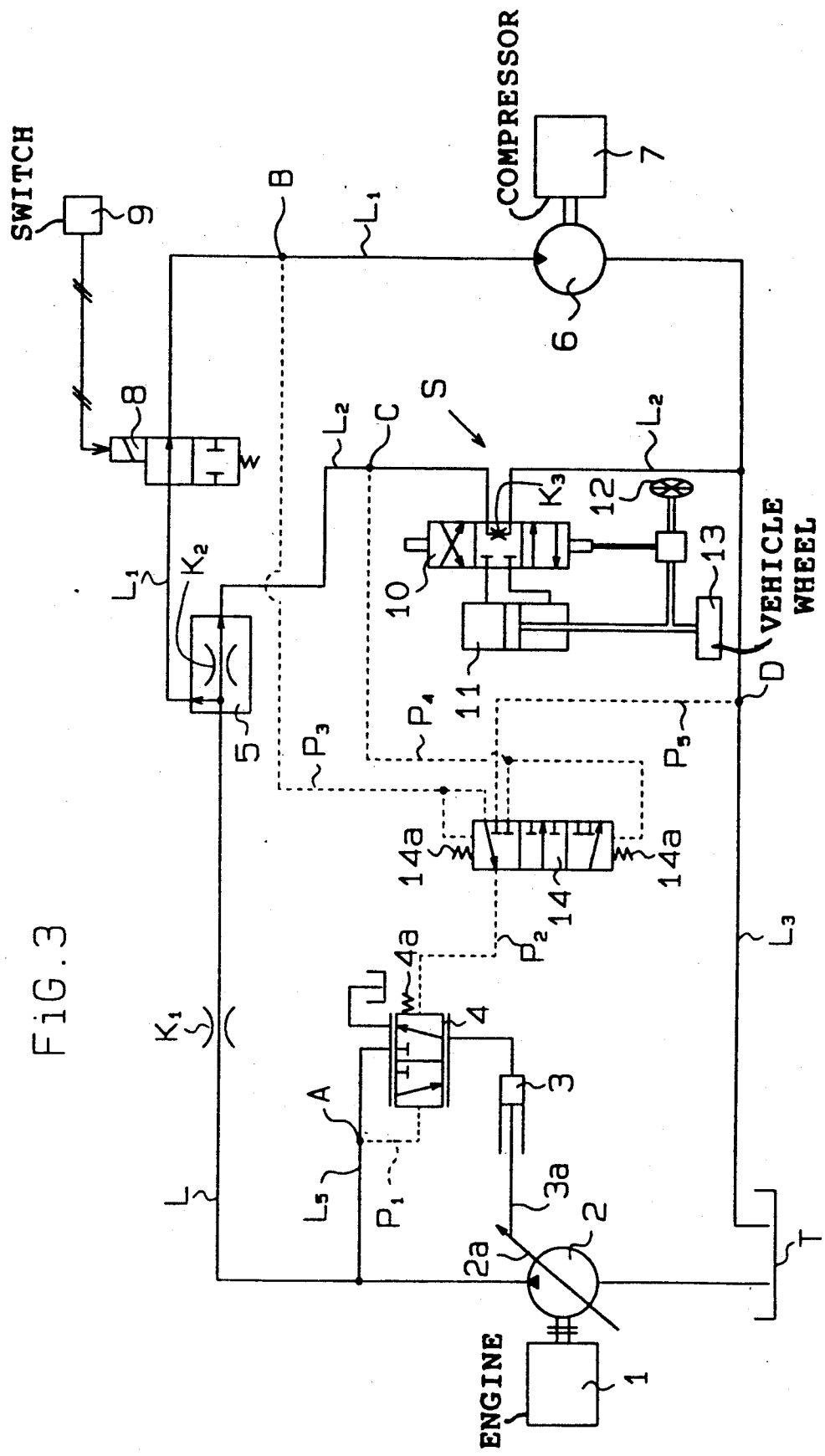
FIG. 3 is a circuit diagram illustrating the condition that occurs when an air conditioning system is operating.
Figure 4:
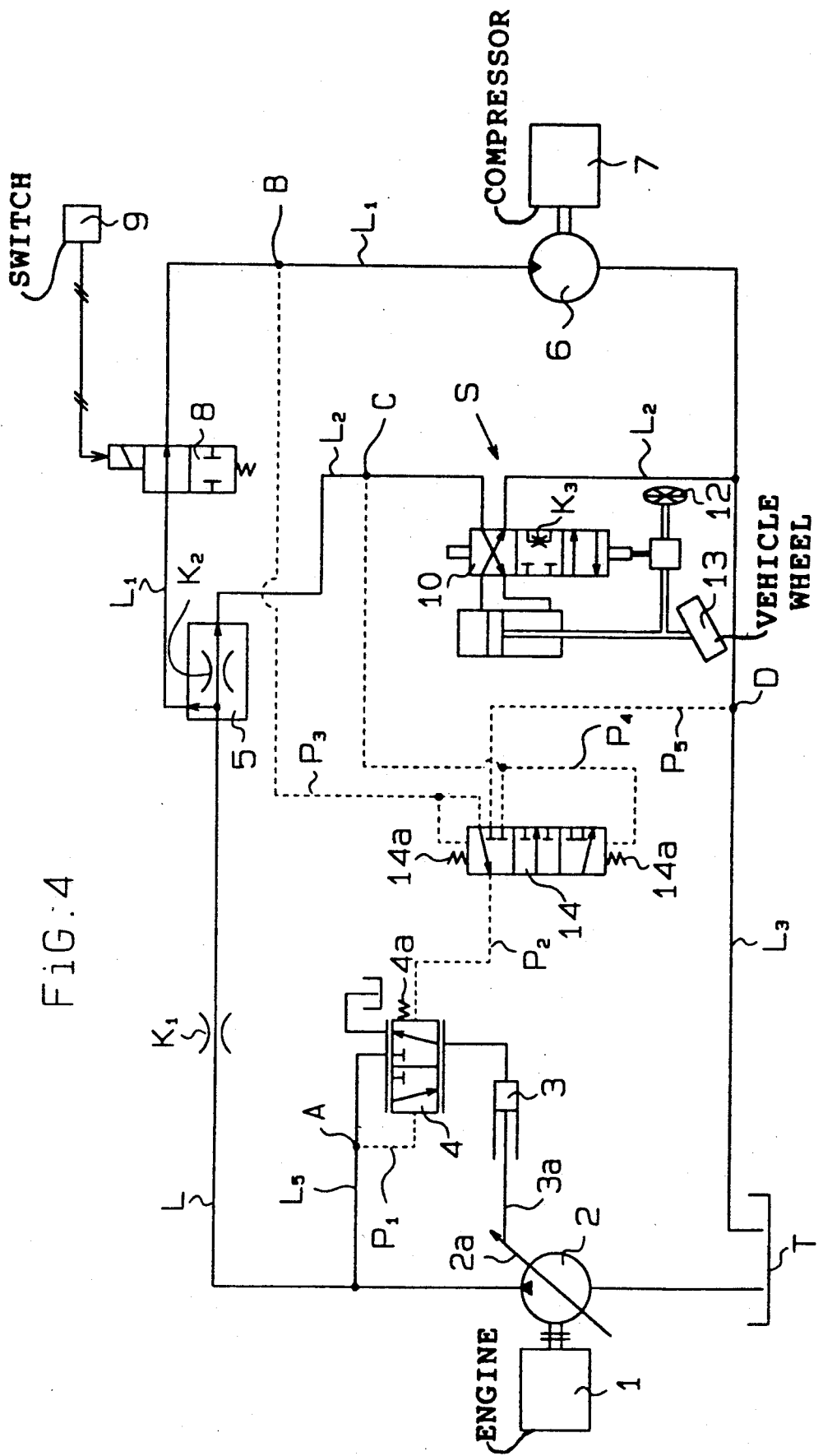
FIG. 4 is a circuit diagram illustrating the state of the hydraulic system when both the power steering mechanism and the air conditioning system are operating.

When the pressure in the path P2 is greater than that in the path P1, the adjusting valve 4 causes the pressurized fluid to flow from the cylinder 3 to the tank T. The fluid flows at a pressure which corresponds to the difference between the pressures in the paths P1 and P2, as shown in FIGS. 3 and 4. The fluid discharge thrusts the cylinder 3 backward, and increases the inclination angle of the swash plate 2a.

The swash plate 2a periodically controls the discharge capacity of the pump 2, i.e. each rotation, as a function of its inclination angle. The greater the inclination angle is, the larger the discharge capacity of the pump 2 becomes. Similarly, the smaller the inclination angle is, the smaller the discharge capacity becomes. The discharge capacity of the pump 2 per unit of time is determined by the rotation velocity of the pump 2, namely the rotation velocity of the engine 1 and the inclination angle of the swash plate 2a.

A first nozzle K1 is disposed along the main fluid line L, downstream from the branching point A. The nozzle K1 is designed to regulate the volume and pressure of pressurized fluid passing through the main line L, only when the pressure of the fluid in the main line L exceeds a predetermined value $\alpha$.

The first and second fluid lines L1 and L2 are simultaneously connected, in parallel, to the main fluid line L, downstream from the nozzle K1, via a flow divider 5. A solenoid valve 8 is disposed along the first fluid line L1, and is normally held closed. A hydraulic motor 6 is placed downstream from the valve 8 along the fluid line L1, and drives an air conditioning compressor 7. When a switch 9 is energized, the valve 8 is opened, and the hydraulic motor 6 is driven by the pressurized fluid pumped out of the pump 2, thus causing the compressor 7 to start functioning.

A second nozzle K2 is disposed within the flow divider 5 along the second fluid line L2. This nozzle K2 is designed to have a narrower throttling capacity than that of the nozzle K1, and serves to control the volume and pressure of the fluid. When the fluid volume in the line reaches a predetermined value $\beta$, wherein $\alpha$ is greater than $\beta$ ($\alpha > \beta$), the nozzle K2 is enabled in order to control the volume of the fluid flowing in the line L2.

A control valve 10 controls a power steering mechanism S. It is disposed downstream from the flow divider 5, and has three chambers and four ports. The steering angle of a wheel 13 is determined by a steering wheel 12. The control valve 10 is capable of switching its position to thrust a power cylinder 11 forward or backward, as a function of the maneuverability of the steering wheel 12. More specifically, the power cylinder 11 has its cylinder rod 11a coupled to the wheel 13, so that the fluid is supplied to the power cylinder 11 for assisting in the adjustment of the steering angle of the wheel 13.

When the steering wheel 12 is generally held in a steady position, immobilized, the control valve 10 disconnects the line L2 from the cylinder 11, as shown in FIGS. 1(a), 1(b) and 3. The pressure of the fluid flowing in the line L2 is controlled by a third nozzle K3 provided in the control valve 10. The third nozzle K3 has a narrower throttling capacity than the second nozzle K2. Both lines L1 and L2 are connected to a return fluid line L3, downstream from the hydraulic motor 6 and the control valve 10. The fluid in the fluid lines L1 and L2 returns to the oil tank T via the fluid line L3.

A third pilot fluid path P3 branches from a point B along the first line L1. A fourth pilot fluid path P4 branches from a point C along the line L2, for ensuring power steering. The paths P3 and P4 are connected to the respective pilot ports of the pressure sensing valve 14.

FIGS. 1(a) and 1(b) illustrate the air conditioning switch 9 and the power steering mechanism S as being disabled. More specifically, the engine 1 is functioning at a low speed, such as in the idling condition, and the control valve 10 is in a neutral state. When the valve 8 is disabled, the pressurized fluid is prevented from entering the fluid line L1. Since the pressure of the fluid in the fluid line L is smaller than the predetermined value $\beta$, the fluid enters the line L2 and its volume and pressure are not affected by the nozzle K2. Although a very small pressure is generated in the pilot fluid path P4, it is insufficient to energize the pressure sensing valve 14.

The pressure of the fluid in the line L2 is dropped to about zero by the nozzle K3 in the control valve 10, before it flows in the line L3. The fluid pressure in the pilot fluid path P2 is connected via a fluid line L4 to the return fluid line L3, also drops to about zero. Consequently, the adjusting valve 4 allows the pressurized fluid to flow to the cylinder 3, and the capacity of the pump 2 is reduced.

When the rotation velocity of the engine 1 increases, the difference between the fluid pressure in the pilot path P1 and that in the pilot path P2, that is the difference between the fluid pressure upstream from the first nozzle K1 and the fluid pressure downstream from the third nozzle K3 increases in proportion to the increased engine velocity. As a result, the quantity of fluid supplied to the cylinder 3 from the adjusting valve 4 increases, thus reducing the inclination angle of the swash plate 2a. In other words, the inclination angle of the swash plate 2a decreases proportionally to the increase in the rotation velocity of the engine 1, for retaining the discharge capacity of the pump 2 at a generally constant level. Therefore, the volume of the fluid Q1 in the second fluid line L2 remains generally constant, regardless of the number of rotation velocity of the engine 1. When neither the compressor 7 nor the power steering mechanism S is activated, as described above, the quantity of fluid Q1 in the main fluid line L and the second fluid line L2 is regulated to a substantially constant level by the nozzle K3.

On the other hand, when the rotation velocity of the engine 1 decreases, the pressures in the main fluid line L and in the branching fluid line L5 (or the fluid pressure in the first pilot fluid path P1) drop. The fluid pressure in the second pilot fluid path P2 is however generally equal to the pressure in the fluid line L2 which is controlled by the nozzle K3. As the pressure in the pilot fluid path P1 decreases, part of the pressurized fluid in the cylinder 3 is discharged, thus increasing the inclination angle of the swash plate 2a. Consequently, the discharge capacity of the pump 2 increases, and the volume of the fluid Q1 is kept substantially constant.

Figure 5:
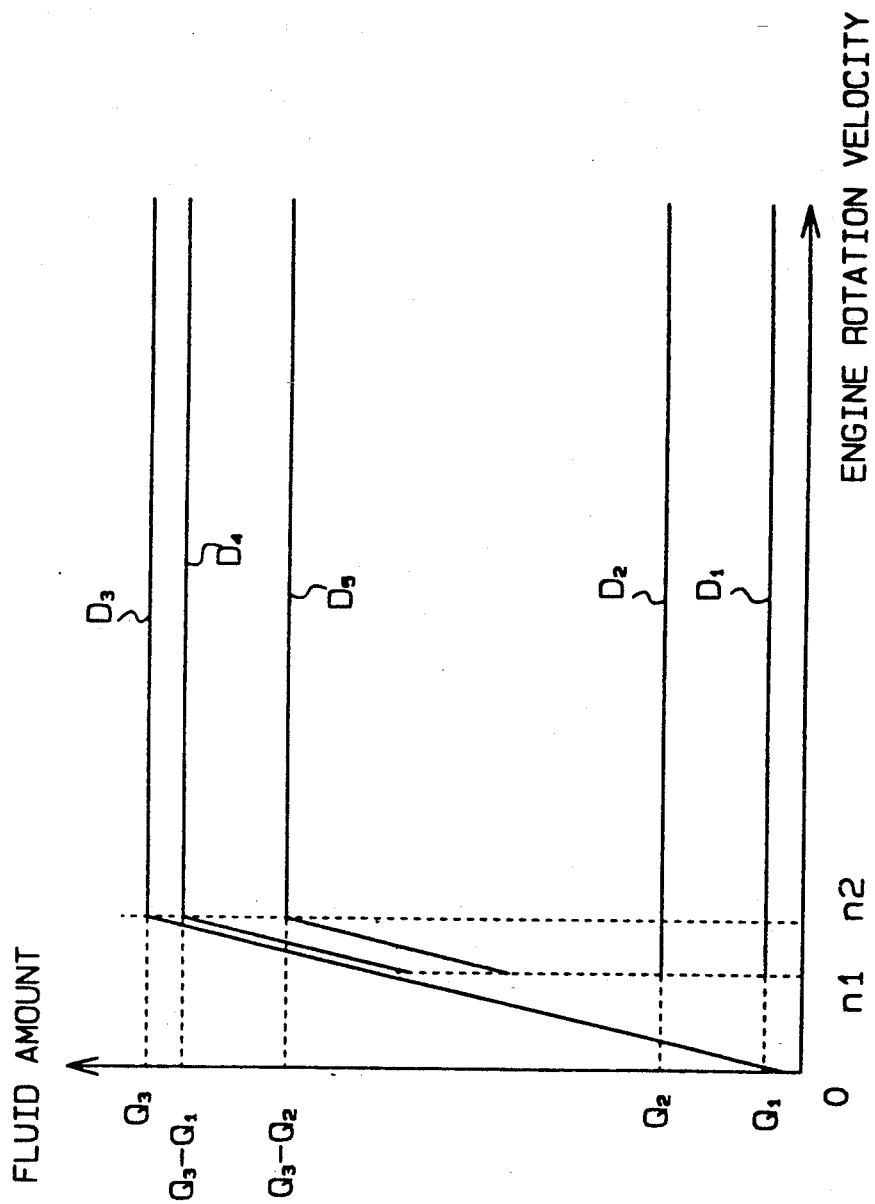
FIG. 5 is a graph showing the relationship between the rotational speed of the engine and the amount of fluid discharged from a hydraulic pump.

The graph in FIG. 5 represents the relationship between the rotation velocity of the engine 1, and the volume of fluids flowing in the main fluid line L, the first fluid line L1, and the second fluid line L2. The straight line D1 corresponds to the case where neither the power steering mechanism S nor the compressor 7 is active, as described above in connection with FIG. 1.

When the valve 10 causes the fluid line L2 to communicate with the cylinder 11 as a function of with the manipulation of the steering wheel 12, as illustrated in FIG. 2, the pressure of the pressurized fluid is regulated by the nozzle K2 and the fluid flows through the line L2. This increases the pressure in the fluid line L2, and increases the pressure in the pilot fluid path P4 via the branching point C. As a result, the pressure sensing valve 14 permits communication between the second and fourth pilot fluid paths P2 and P4.

The pressure generated in the pilot fluid path P4 and the pressure from the pilot fluid path P1 act on the adjusting valve 4, to cause the pressurized fluid in the cylinder 3 to be partially discharged. The cylinder 3 is thus thrust backward to increase the inclination angle of the swash plate 2a, and to increase the discharge capacity of the pump 2 beyond the capacity shown in FIG. 1(b). When the rotation velocity of the engine 1 changes, the difference between the fluid pressure in the pilot fluid path P1 and that in the pilot fluid path P2, or the difference between the fluid pressure upstream from the first nozzle K1 and the fluid pressure downstream from the third nozzle K3 increases proportionally to the variation in the engine velocity, for adjusting the inclination angle of the swash plate 2a. Accordingly, the discharge capacity of the pump 2 is regulated so that the quantity of the fluid Q2 in the second fluid line L2 becomes generally constant, regardless of the rotation velocity of the engine 1. When only the power steering mechanism S is activated, the volume of the fluid Q2 in the main fluid line L and in the fluid line L2 is regulated to a generally constant level by the nozzle K2.

When the rotation velocity of the engine 1 decreases, the pressure regulated by the nozzle K2 in the pilot fluid path P2 does not change, but the pressure in the main fluid path P1 drops. Consequently, the discharge capacity of the pump 2 decreases, thus keeping the volume of the fluid Q2 generally constant.

The straight line D2 in FIG. 5 represents the discharge capacity (Q2) of the pump 2, as a function of change in the rotation velocity of the engine 1, where only the power steering mechanism S is functioning.

As illustrated in FIG. 3, when the valve 8 is opened by energizing the switch 9, the motor 6 is driven, and the pressure in the fluid line L rises to about, or above the predetermined value a, thus causing the nozzle K1 to function. The fluid pressure and volume are regulated by the nozzle K1, and the fluid flows through the fluid line L1. This generates pressure in the pilot fluid path P3 via the branching point B, in direct proportion to the volume of the fluid controlled by the nozzle K1. As a result, the pressure sensing valve 14 permits communication between the second and third pilot fluid paths P2 and P3.

Accordingly, the adjusting valve 4 causes the pressurized fluid to flow from the cylinder 3 due to the pressure in the pilot fluid path P2 and the spring force. The cylinder 3 is thrust backward to increase the inclination angle of the swash plate 2a, and increases the capacity of the pump 2.

When the rotation velocity of the engine 1 increases to, or exceeds a predetermined value n2, the difference in the pressurized fluid on either side of the fluid path across the nozzle K1 increases proportionally to the increased engine velocity, thus raising the pressure in the pilot fluid path P1. Consequently, the cylinder 3 is thrust forward to reduce the inclination angle of the swash plate 2a, and to lower the discharge capacity of the pump 2. Furthermore, the quantity of fluid Q3 flowing in the main fluid line L, becomes substantially constant regardless of the rotation velocity the engine 1. When only the compressor 7 is functioning, the volume of fluid Q3 in the main fluid line L is regulated to a generally constant level Q3 by the nozzle K1.

The curve D3 in FIG. 5 illustrates the discharge capacity of the pump 2 as a function of the variation in the rotation velocity of the engine 1, when the switch 9 is energized. When the rotation velocity of the engine 1 is between a predetermined value n1 (in the idling state), and n2, the volume of fluid is substantially proportional to the rotation velocity of the engine. When the velocity of the engine 1 is equal to, or exceeds n2, the discharge capacity of the pump 2 is kept constant by the control valve 4, as indicated by the straight line D3. A volume Q1 of the fluid flows through the fluid line L2. The curve D4 in FIG. 5 shows the volume of fluid flowing through the first fluid line L1 as (Q3−Q1).

When the steering wheel 12 is manipulated simultaneously with the activation of the air conditioning switch 9, the pressure in the fluid path P3 becomes higher than that in the fluid path P4, and the pressure sensing valve 14 allows the second pilot fluid path P2 to communicate with the third pilot fluid path P3, as shown in FIG. 4. As a result, the pressure along paths P3 and P2 acts on the adjusting valve 4.

The pump 2 is therefore set in the large capacity state as illustrated in FIG. 3, so that the volume of fluid outputed by the pump 2 becomes generally constant (Q3), when the rotation velocity is equal to, or is greater than n2. A volume Q2 of the fluid flows through the fluid line L2, and the remaining volume (Q3−Q2) flows through the fluid line L1.

The curve D5 in FIG. 5 illustrates the volume of the fluid flowing through the fluid line L1, as a function of the variation in the rotation velocity of the engine 1. As indicated by the curves D4 and D5, when the power steering mechanism S is activated, the volume of fluid flowing through the fluid line L1 is lower than when the power steering mechanism S is deactivated, by a volume differential (Q2−Q1), thus causing the rotation velocity of the hydraulic motor 6 to drop. Since the operational period of the power steering mechanism S is normally short, the reduction of the fluid volume to be supplied to the fluid line L1 will not significantly affect the operation of the air conditioning.

When neither the power steering mechanism S nor the air conditioning system is operational, the pressurized fluid outputed by the pump 2 circulates along the fluid line L2 and is controlled by the nozzle K3. The volume of fluid outputed by the pump 2 is significantly lower than the output volume when either the power steering mechanism S or the air conditioning system is functioning. The engine load for the supply of the presurized fluid is significantly low, and consequently leads to a significant saving of energy.

The volume of the output fluid, when either the power steering mechanism S or the air conditioning system is operational, is reduced to the demand level, even when the engine speed increases. The volume of fluid needed to operate the power steering mechanism S or the air conditioning system can therefore be reduced, thus resulting in a significant reduction in the power consumption.

Furthermore, since only the volume quantity of fluid which is demanded by the power steering mechanism S or the air conditioning system needs to be supplied, the pump 2 is not required to have a very high capacity. Likewise, the motor 6 is not required to have a very high capacity.

Figure 6:
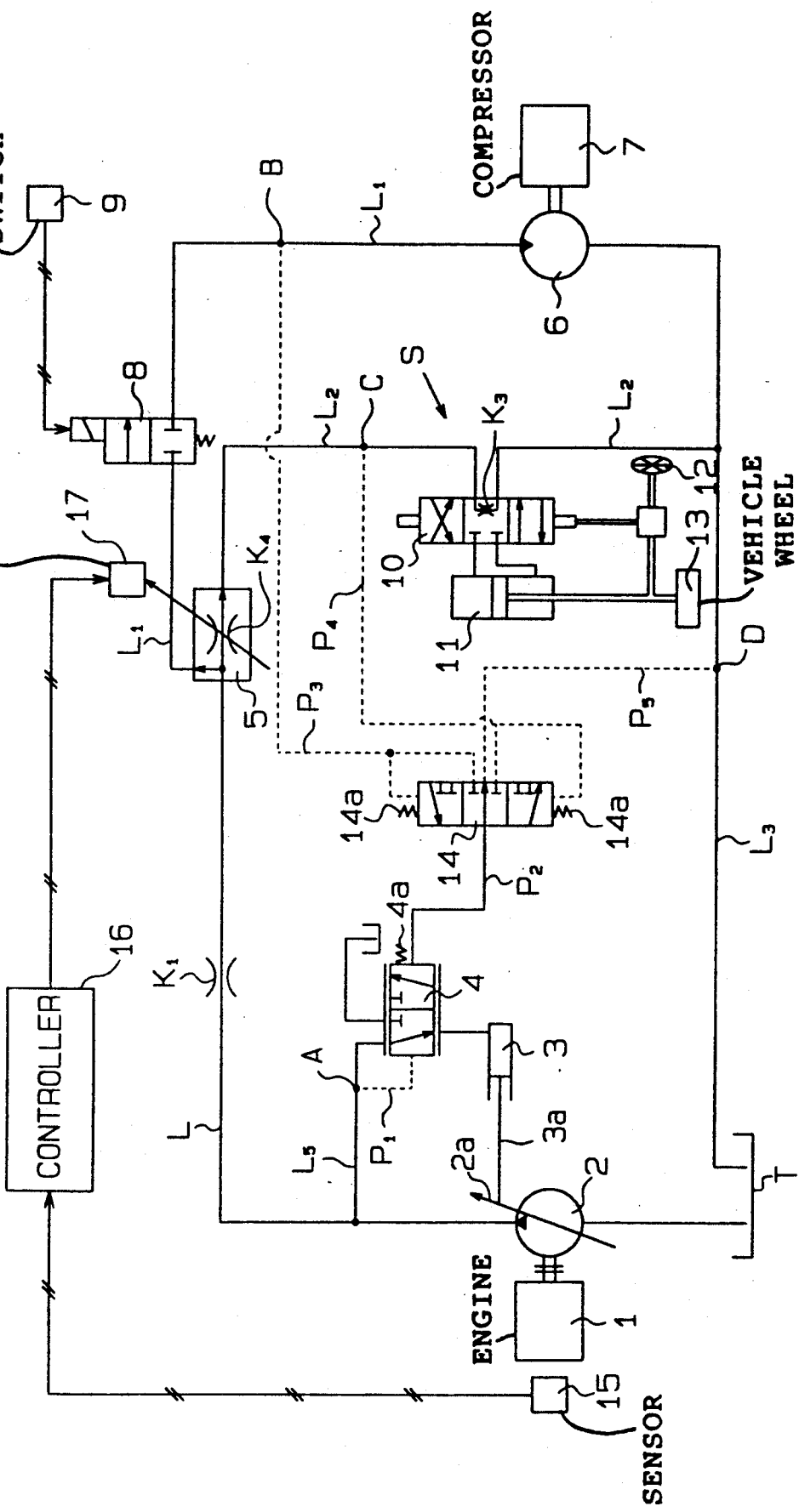
FIG. 6 is a hydraulic circuit diagram illustrating a modification of the hydraulic system of the present invention.
Figure 7:
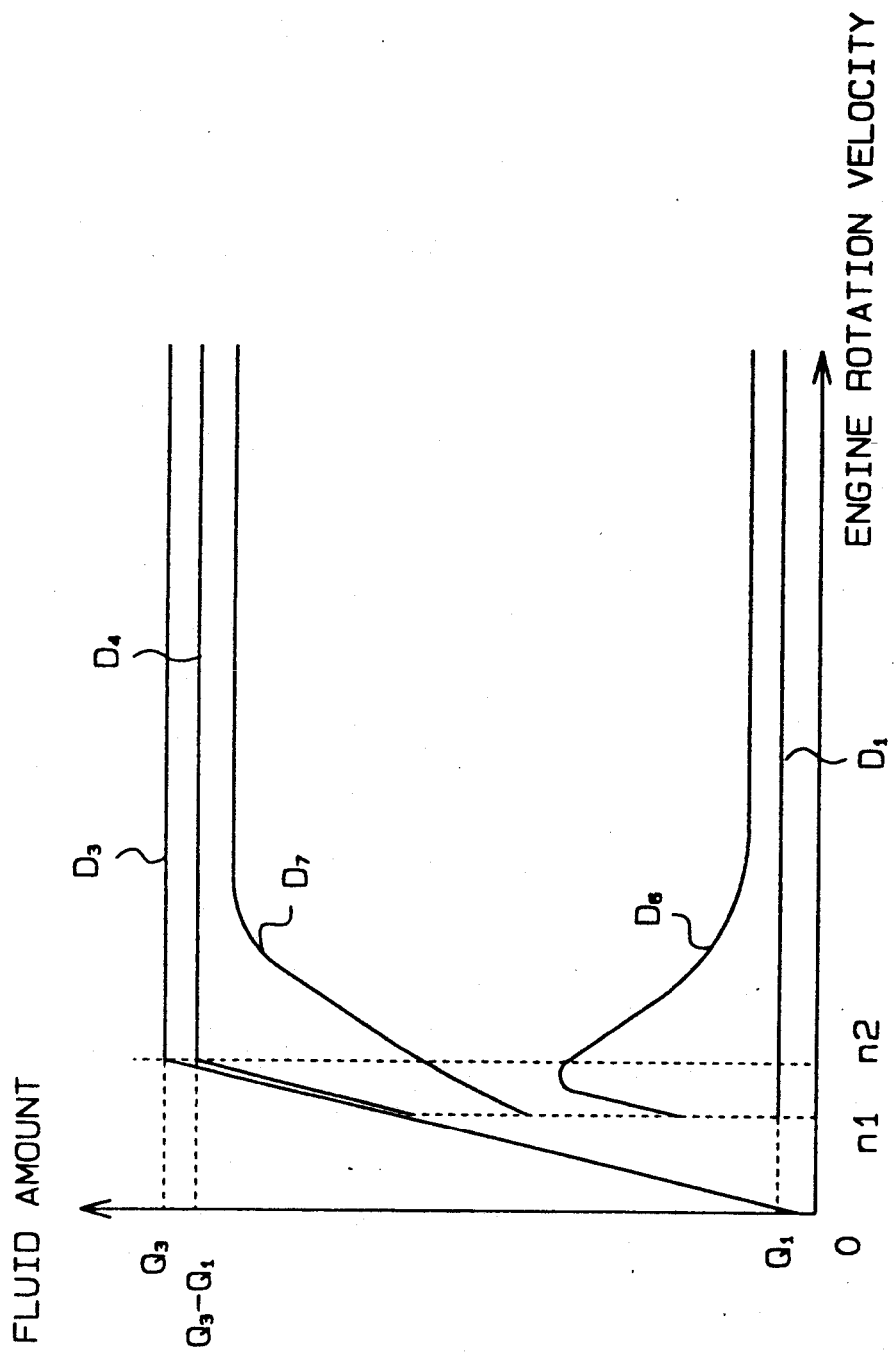
FIG. 7 is a graph showing the relationship between the rotational speed of the engine and the amount of fluid discharged from a hydraulic pump in the circuit shown in FIG. 7.
Figure 8:
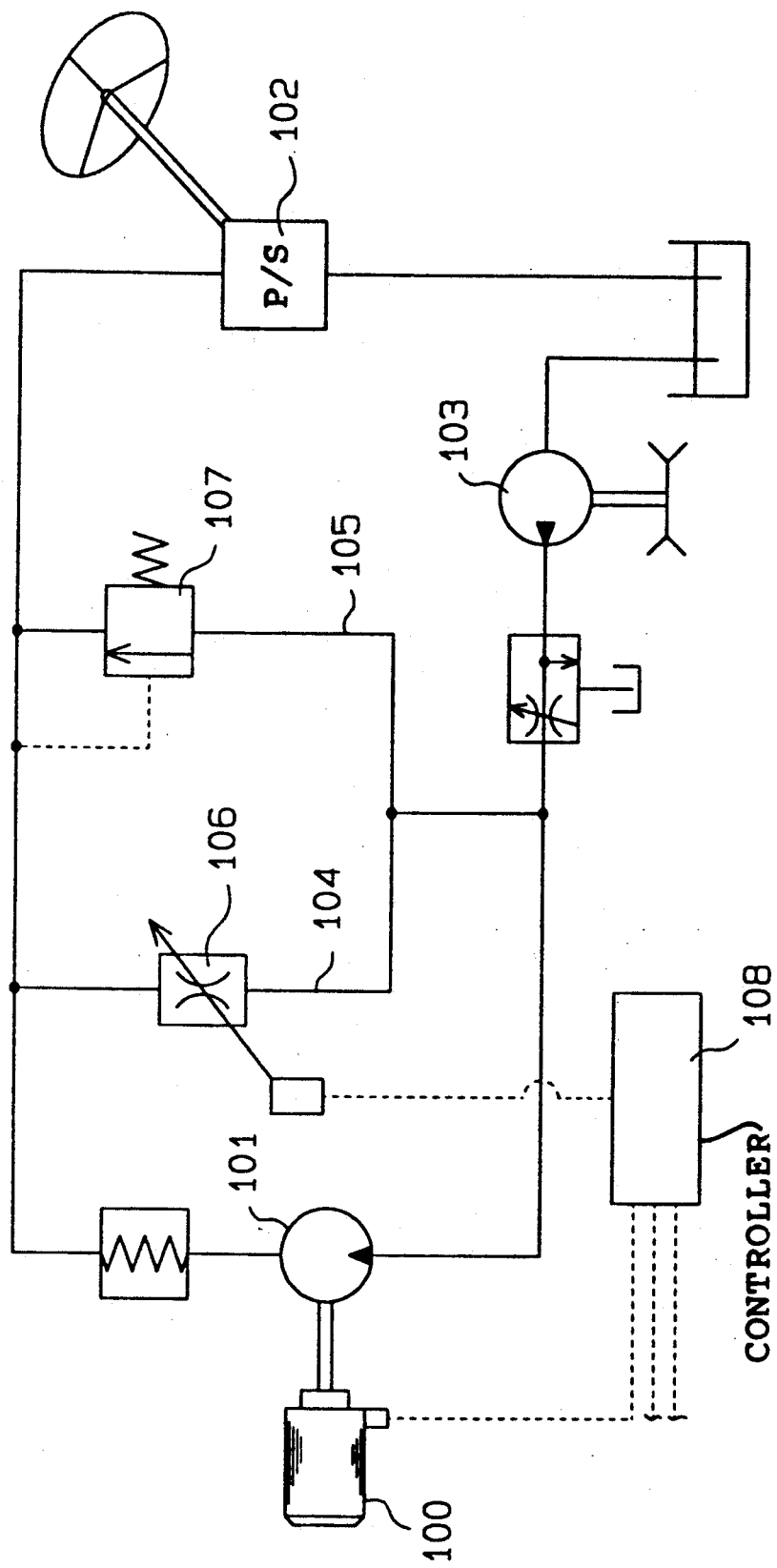
FIG. 8 is a hydraulic circuit diagram showing a conventional hydraulic system.

The present invention is not limited to the above-described embodiment, but may be applied to other hydraulic systems. For example, FIG. 6 shows a variable nozzle K4 which is used in place of the nozzle K2, in order to regulate the fluid pressure in the fluid line L2 to the steering wheel. The rotation velocity of the engine 1 is detected by a rotation sensor 15 which includes an encoder, such as a rotary encoder. The rotation sensor 15 causes the controller 16 to drive an actuator 17, for controlling the aperture of the nozzle K4. The curve D6 in FIG. 7 shows the volume of fluid in the line L2 when the power steering mechanism S is operational. The curve D7 shows the volume of fluid in the line L1 when both the power steering mechanism S and the air conditioning system are operational.

The curve D6 represents the flow rate characteristic for improving the manipulation of the wheel 13 by the power steering mechanism S, when the engine is functioning at a low speed, i.e. when the vehicle is moving at a low speed. The curve D7 illustrates the fluid volume as a function of the rotation velocity, and reflects the resulting improvement to the wheel steering control.

The opening of the variable nozzle K4 may alternatively be controlled based on information reflective of the velocity of the vehicle rather than the rotation speed of the engine.

In an alternative embodiment, the nozzle K3 is disposed within the fluid line L2 downstream from the control valve 10.

What is claimed is:

1. An hydraulic system for a vehicle, operably coupled to an engine, for driving first and second hydraulic mechanisms disposed within first and second fluid lines of an hydraulic pump, respectively, said first and second fluid lines being connected to an hydraulic tank by way of a circulation fluid line, the discharge capacity of the hydraulic pump changing as a function of the angle of inclination of a swash plate, and the first and second hydraulic mechanisms having different fluid pressure demand characteristics, said hydraulic system comprising:

first means for depressurizing the first fluid line when the first hydraulic mechanism is used;
second means for depressurizing the second fluid line when the second hydraulic mechanism is used;
third means for depressurizing the circulation fluid line when neither the first hydraulic mechanism nor the second hydraulic mechanism is used; and
swash plate control means for controlling the angle of inclination of the swash plate as a function of the output pressures of said first, second and third depressurizing means.

2. The hydraulic system according to claim 1, wherein the first hydraulic mechanism is a hydraulic motor for driving an air conditioning compressor, and the second hydraulic mechanism is a power steering hydraulic mechanism having a lower fluid demand than that of said hydraulic motor of said air conditioning compressor.

3. The hydraulic system according to claim 2, wherein the vehicle includes a steering wheel and at least one vehicle wheel, and wherein said power steering hydraulic mechanism includes:

an hydraulic power cylinder coupled to said vehicle wheel; and
a direction control valve for supplying fluid to said hydraulic power cylinder and for discharging fluid therefrom to thrust the hydraulic power cylinder forward and backward in relation to the position of said steering wheel.

4. The hydraulic system according to claim 3, wherein:

said first, second and third depressurizing means include a first, second and third nozzles;
the volume of fluid controlled by said first nozzle is greater than that controlled by said second nozzle; and
the fluid volume controlled by said second nozzle is greater than that controlled by said third nozzle.

5. The hydraulic system according to claim 4, wherein said first hydraulic mechanism includes an air conditioning switch, and wherein said first fluid line has a normally closed valve which is activated when said air conditioning switch is energized.

6. The hydraulic system according to claim 5, wherein said swash plate control means includes:

an hydraulic cylinder having a cylinder rod connected to the swash plate; and
a tracer valve that controls the respective inlet and outlet fluid volumes to be supplied to and discharged from the hydraulic cylinder, wherein each of said volumes is a function of the pressures on said tracer valve from both the circulation fluid line and a depressurized fluid line leading to either of said first and second hydraulic mechanisms.

7. The hydraulic system according to claim 6, wherein the pressure on said tracer valve from the circulation fluid line is transmitted to said tracer valve via a first pilot fluid line;

wherein said depressurized fluid line is one of the lines downstream from said first and second nozzles selected by a switching valve and the pressure is transmitted from said one of the lines downstream to said tracer valve via a second pilot fluid line; and wherein when said switching valve selects the pressure in a line downstream from said third nozzle, said tracer valve releases the pressure in said second pilot fluid line.

8. An hydraulic system for a vehicle, operably coupled to an engine, for driving first and second hydraulic mechanisms disposed within first and second fluid lines of an hydraulic pump respectively, said first and second fluid lines being connected to an hydraulic tank by way of a circulation fluid line, the discharge capacity of the hydraulic pump changing as a function of the angle of inclination of a swash plate, and the first and second hydraulic mechanisms having different fluid pressure demand characteristics, said hydraulic system comprising:

a first nozzle for depressurizing the first fluid line when the first hydraulic mechanism is used;

a second nozzle for depressurizing the second fluid line when the second hydraulic mechanism is used;

a third nozzle for reducing the pressure of the circulation fluid line to almost zero when neither the first hydraulic mechanism nor the second hydraulic mechanism is used, the volume of fluid controlled by said first nozzle being larger than that of said second nozzle, and the volume of fluid controlled by said second nozzle being larger than that of said third nozzle; and swash plate control means for controlling the angle of inclination of the swash plate as a function of the output pressure of said first, second and third nozzles.

9. The hydraulic system according to claim 8, wherein the first hydraulic mechanism is a hydraulic motor for driving an air conditioning compressor, and the second hydraulic mechanism is a power steering hydraulic mechanism having a lower fluid demand than that of said hydraulic motor of said air conditioning compressor.

10. The hydraulic system according to claim 9, wherein the vehicle includes a steering wheel and at least one vehicle wheel, and wherein said power steering hydraulic mechanism includes:

a hydraulic power cylinder coupled to said vehicle wheel; and a direction control valve for supplying fluid to said hydraulic power cylinder and for discharging fluid therefrom to thrust the hydraulic power cylinder forward and backward in relation to the position of said steering wheel.

11. The hydraulic system according to claim 10, wherein said first hydraulic mechanism includes an air conditioning switch, and wherein said first fluid line has a normally closed valve which is activated when said air conditioning switch is energized.

12. The hydraulic system according to claim 11, wherein said swash plate control means includes:

an hydraulic cylinder having a cylinder rod connected to the swash plate; and a tracer valve that controls the respective inlet and outlet fluid volumes to be supplied to and discharged from the hydraulic cylinder, wherein each of said volumes is a function of the pressures on said tracer valve from both the circulation fluid line and a depressurized fluid line leading to either of said first and second hydraulic mechanisms.

13. The hydraulic system according to claim 12, wherein the pressure on said tracer valve from the circulation fluid line is transmitted to said tracer valve via a first pilot fluid line;

wherein said depressurized fluid line is one of the lines downstream from said first and second nozzles selected by a switching valve and the pressure is transmitted from said one of the lines downstream to said tracer valve via a second pilot fluid line; and wherein when said switching valve selects the pressure in a line downstream from said third nozzle, said tracer valve releases the pressure in said second pilot fluid line.

14. An hydraulic system for a vehicle, operably coupled to an engine, for driving a hydraulic motor of an air conditioning compressor and for driving a power steering hydraulic mechanism having a lower fluid pressure demand characteristic than that of said hydraulic motor of said air conditioning compressor, the hydraulic motor and the power steering hydraulic mechanism being disposed along first and second fluid lines of an hydraulic pump respectively, said first and second fluid lines being connected to an hydraulic tank by way of a circulation fluid line, the discharge capacity of the hydraulic pump changing as a function of the angle of inclination of a swash plate, the hydraulic system comprising:

a first nozzle for depressurizing the first fluid line when the hydraulic motor of said air conditioning compressor is used;

a second nozzle for depressurizing the second fluid line when the power steering hydraulic mechanism is used;

a third nozzle for reducing the pressure of said circulation fluid line to almost zero when neither the hydraulic motor of said air conditioning compressor nor the power steering hydraulic mechanism is used, the volume of fluid controlled by said first nozzle being greater than that of said second nozzle and that of said third nozzle; and a swash plate control means for controlling the angle of inclination of the swash plate as a function of the downstream pressures from said first, second and third nozzles, said swash plate control means including:

an hydraulic cylinder having a cylinder rod coupled to the swash plate, and a tracer valve that controls the respective inlet and outlet pressurized fluid volumes to be supplied to and discharged from said hydraulic cylinder, each of said volumes being a function of the pressures on said tracer valve from both the circulation fluid line and a depressurized fluid line on a side of the hydraulic mechanism.

15. The hydraulic system according to claim 14, wherein the vehicle includes a steering wheel and at least one vehicle wheel, and wherein said power steering hydraulic mechanism includes:

a hydraulic power cylinder coupled to said vehicle wheel; and a direction control valve for supplying fluid to said hydraulic power cylinder and for discharging fluid therefrom to thrust the hydraulic power cylinder forward and backward in relation to the position of said steering wheel.

16. The hydraulic system according to claim 15, wherein said first hydraulic mechanism includes an air conditioning switch, and wherein said first fluid line has a normally closed valve which is activated when said air conditioning switch is energized.

17. The hydraulic system according to claim 16, wherein the pressure on said tracer valve from the circulation fluid line is transmitted to said tracer valve via a first pilot fluid line;

wherein said depressurized fluid line is one of the pressures in the lines downstream from said first and second nozzles selected by a switching valve and the pressure is transmitted from said one of the lines downstream to said tracer valve via a second pilot fluid line; and wherein when said switching valve selects the pressure in a line downstream from said third nozzle, said tracer valve releases the pressure in said second pilot fluid line.

18. An hydraulic system for a vehicle, operably coupled to an engine, for driving first and second hydraulic mechanisms disposed within first and second fluid lines of an hydraulic pump respectively, said first and second fluid lines being connected to an hydraulic tank by way of a circulation fluid line, the discharge capacity of the hydraulic pump changing as a function of the angle of inclination of a swash plate, and the first and second hydraulic mechanisms having different fluid pressure demand characteristics, said hydraulic system comprising:

a first nozzle for depressurizing the first fluid line when the first hydraulic mechanism is used;

a second nozzle for depressurizing the second fluid line when the second hydraulic mechanism is used;

a third nozzle for depressurizing the circulation fluid line when neither the first hydraulic mechanism nor the second hydraulic mechanism is used;

swash plate control means for controlling the angle of inclination of the swash plate as a function of the output pressures of said first, second and third nozzles, said swash plate control means including:

an hydraulic cylinder having a cylinder rod connected to the swash plate;

a tracer valve that controls the respective inlet and outlet fluid volumes to be supplied to and discharged from the hydraulic cylinder, each of said volumes being a function of the pressures on said tracer valve from both the circulation fluid line and a depressurized fluid line;

a first pilot fluid line for transmitting the pressure from said circulation fluid line to said tracer valve; and a second pilot fluid line for transmitting the pressure from said depressurized fluid line to said tracer valve, said depressurized fluid line being one of the lines leading to either of said first and second hydraulic mechanisms and being downstream from said first and second nozzles, and said one of the lines being selected by a switching valve, said tracer valve releasing the pressure in said second pilot fluid line when said switching valve selects the pressure from a line downstream from said third nozzle.

* * * * *